July 7, 1970     P. T. JENNINGS     3,519,515
HEAT SEALING METHOD FOR PLASTIC FILMS
Filed Oct. 28, 1966
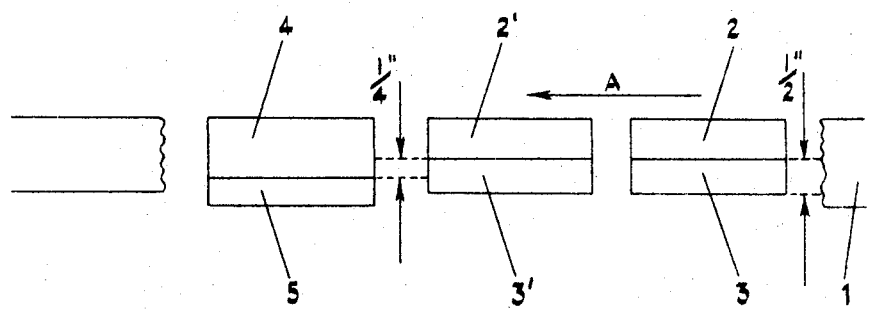
INVENTOR
PETER THOMAS JENNINGS
By Cushman, Darby & Cushman
ATTORNEYS

United States Patent Office 3,519,515
Patented July 7, 1970

3,519,515
HEAT SEALING METHOD FOR PLASTIC FILMS
Peter Thomas Jennings, Stevenage, England, assignor to British Visqueen Limited, London, England, a corporation of Great Britain
Filed Oct. 28, 1966, Ser. No. 590,302
Claims priority, application Great Britain, Nov. 8, 1965, 47,258/65
Int. Cl. C09j 5/00
U.S. Cl. 156—311
12 Claims

ABSTRACT OF THE DISCLOSURE

A method of forming an elongated heat seal between at least two adjacent layers of plastic film by applying thereto heat sufficient to melt the film layers and then applying forced cooling to the seal so produced while it is held between two surfaces, in which the forced cooling is applied to only a portion of the width of the seal along the length thereof, and the remaining portion is allowed to cool slowly from the molten state.

---

This invention relates to the heat sealing of plastic films.

More particularly, the invention relates to a method and apparatus for forming an elongated heat seal between two or more layers of plastic film, of the type in which heat sufficient to melt the film layers is applied to the region to be joined, and forced cooling is applied to the seal so produced while it is held between two surfaces, to chill it from the molten state.

Methods of this type are frequently used for such purposes as closing the mouths of filled bags, and the seal is often subjected to stress immediately after its formation, during removal of the bag from the heat sealer and during further handling of the bag. The heat seal is therefore brought by chilling to a self sustaining form having sufficient strength to resist damage during handling. If cooling is not applied before the seal is released, the seal is highly vulnerable to stresses from the contents of the bag, or from changes in direction of the conveyor system. We have found however that the final strength of the seal so produced by such methods with the application of forced cooling is generally considerably less than the strength of the film, and this is obviously a disadvantage.

In accordance with the present invention, we provide a method of forming an elongated heat seal between at least two adjacent layers of plastic film by applying thereto heat sufficient to melt the film layers and then applying forced cooling to the seal so produced while it is held between two surfaces, in which said forced cooling is applied to only a portion of the width of the seal along the length thereof, and the remaining portion is allowed to cool slowly from the molten state.

The seal may if desired be a composite seal comprising two closely spaced elongated welds, in which case the forced cooling may be applied to only one of the welds, while the other is allowed to relax by slow cooling.

The present invention also provides apparatus for forming elongated heat seals between two or more layers of plastics film and comprising means for holding said layers in contact with each other, means for heating said layers to a temperature above the melting point of the plastics and means for cooling the seal so produced comprising two cooled surfaces for simultaneously contacting opposite sides of the seal, in which said cooled surfaces are adapted to contact only a portion of the width of the seal along the length thereof.

Where one side of the seal is subjected to the greater stress during handling after removal from the heat sealing machine, as is usually the case, then the cooling is applied to this side of the seal. Thus, in sealing the mouths of filled bags the cooling is applied to the lower portion of the seal.

Whilst the method of the invention is generally applicable to and used with advantage in any circumstances in which two or more layers of film are sealed together by a method as described, it is of particular use as a modification of the well known Doughboy method, or of similar band sealing methods, for sealing the mouths of filled plastic sacks. In such methods, the sacks are carried along, usually in an upright position, by carrier chains or similar means, and the closed mouth portions of the sacks are passed between and engaged by two opposed endless travelling bands of thin metal, of a width at least equal to the desired width of the seal. These bands with the sack mouths between them then travel between one or more pairs of heating blocks, which press against their outer surfaces and provide heat through the bands to form the seal between the surfaces of the film, and then between paired cooling blocks which chill the seal, through the bands, across its whole width. Beyond the cooling blocks, the mouth portions of the sacks are released from the travelling bands.

The method of the invention is especially of value for sealing the mouths of filled gusseted plastic sacks by means of heat sealing machines of the Doughboy type. A difficulty of sealing these gusseted sacks with the standard Doughboy or like machine is that a point of weakness of the seal, or even a pinhole aperture, is formed at the inner edge of the gussets where the number of film layers changes from four to two, or vice versa. When the seal is cooled in the normal way, this weakness becomes frozen into the seal and frequently leads to rupture of the seal or leakage of water into the sack. By substituting the method of this invention, relaxation of the upper part of the seal in these positions is allowed and a strong continuous seal may be obtained across the whole mouth of the gusseted sack. The method is also very useful in plastics sack manufacture for forming the bottom seams of the sacks, especially gusseted sacks, and particularly when the sack making machine incorporates a band sealer. It is in general particularly useful for forming seals in which the number of film layers included in the seal varies along the length thereof.

The part of the seal that is allowed to relax during slow cooling from the molten state while forced cooling is applied to the other part may be, but is not necessarily, held between two surfaces, which of course are not chilled, during at least a part of the cooling step.

One preferred form of the invention will now be described with reference to the accompanying drawing, which is a diagrammatic front elevation of one side of the sealer parts of a standard Doughboy sack sealing machine, modified for use in accordance with the invention, shown with the sealing band partly cut away.

In this drawing: 1 is one of the continuous travelling sealing bands of the machine, which is suitably a steel band 1 inch wide and 0.01 inch thick, coated with a separating aid such as polytetrafluoroethylene; 2, 2' are the spring-loaded heating blocks, each carrying a heating insert, 3, 3', the face of which projects from the face of the heating block, is urged against the back face of the sealing band by the spring loading of the block, and, in the machine shown, is 0.5 inch deep; 4 is a similarly spring-loaded cooling block, internally cooled by circulating water, carrying a projecting cooling insert, 5, the face of which in the machine shown is 5/16 inch deep, which is urged against the back face of the sealing band and is set with its upper edge 1/4 inch below the level of the upper edges of the heating inserts, 3, 3'. It will be seen, therefore, that the machine illustrated is a machine of standard type modified only in that the cooling inserts are narrower in width than in the standard machine, and are in line with only the lower halves of the heating inserts.

In operation of the machine, the mouth of a sack advancing in direction A, gripped and held closed at a level just below the sealing bands between the carrier chains (not shown) of the Doughboy sealer, is engaged between the two travelling sealing bands, 1, and passes with them between the paired heating inserts at 3, 3', and then between the paired cooling inserts at 5. Because of the thinness of the sealing bands, the area of heating and cooling by the inserts is virtually limited to the portions covered by the inserts. Thus, the mouth of the sack emerging from the sealing bands bears along its length a continuous seal between the surfaces consisting of a ¼ inch wide band of force-cooled weld which is sufficiently strong to withstand stresses from the sack contents immediately after the sack is released from the Doughboy sealer, and, immediately above it and continuous with it, a further ¼ inch wide seal which emerges from the Doughboy still in the molten state, to relax on cooling in air.

The spring-loading of the heating and cooling blocks of the standard Doughboy machine is provided with an adjustable stop mechanism by which the minimum gap between the opposed faces of the sealing bands may be set. For the sealing of gusseted sacks, this gap is set to the width desired for providing maximum strength of the middle, 2-layer thick section of the mouth of the sack, which takes the greatest strain. It will be appreciated that it is impossible under these circumstances for the heating blocks to apply a uniform pressure across the whole mouth of the sack, particularly at the inner edges of the gussets, and weakness or faults in the seal are particularly likely to be formed in these positions. It is for this reason that the method of the invention is applied with particular advantage to the sealing of gusseted sacks.

We have found, however, that even for sealing together two uniform layers of film the method gives a substantially stronger seam than when forced cooling is applied to the whole width of the seal. We have also found that the method gives a substantial improvement in strength of seals formed between contaminated heat seal surfaces, for example in sealing the mouths of bags contaminated with dusty substances.

In a particular example, tests were made on the sealing of the mouths of heavy duty (.0008 inch thick) polythene film non-gusseted sacks, first with a standard Doughboy machine and then with the machine modified as shown in the accompanying drawing, heating and cooling cycles being identical. Sack mouths contaminated with sodium carbonate were also sealed with the modified machine. The following results were obtained:

|  | Tensile strength, p.s.i. | Elongation, percent |
| --- | --- | --- |
| Virgin film, body strength | 3,720 | 470 |
| Virgin film, standard Doughboy seal | 2,280 | 190 |
| Virgin film, modified seal | 3,380 | 380 |
| Contaminated film, modified seal | 3,240 | 280 |

The cost of modifying the standard Doughboy machine in accordance with the invention is extremely small.

Various modifications may be made in the machine particularly described and illustrated, and other heat sealing methods and machines may be modified to form seals in accordance with the invention. For example, the sealing bands of the machine illustrated may be longitudinally slit into two parts, and if desired the two parts may be slightly separated to give a composite seal as mentioned hereinbefore, cooling being applied only to the lower weld. In such case the upper sealing band part need not necessarily extend to the cooling zone, although it may be more convenient for it to do so, so that the two parts may be carried by common pulleys. If single sealing bands are used, these need not be continuous through the heating band sealing zones, although such an arrangement is generally more convenient. Separate bands may however be used for the cooling zone, and these may if desired contact only the part of the seal to which forced cooling is applied, the remainder of the seal being left free.

In impulse heat sealing machines, the method of the invention may be operated by modifying the cooling arrangements of the machine, so that forced cooling is applied to only a portion of the width of the seal along its length. Or a composite seal comprising two closely spaced welds may be formed, forced cooling being applied to only one of the welds.

As well as being used in methods in which the film layers are heated while they are held between two surfaces, the method of the invention may also be used as a modification of a heat sealing method in which the film layers are fused by heat supplied in known manner by radiant heaters or by jets of hot air, and in which the seal is subsequently chilled by cold surfaces pressed against opposite sides thereof. In such a method, cooling is applied to only a portion of the width of the seal along the length thereof. Radiant heat or jets of hot air may also be used to heat the film layers through sealing bands of metallic construction, for example as a modification of the Doughboy method described, instead of being used to heat the film directly.

It is generally convenient and satisfactory to apply forced cooling to half the width of the seal, the other half being allowed to relax during slow cooling. However, forced cooling may be applied to more or to to less than half the width of the seals to suit particular circumstances. It is necessary only that enough of the seal be force-cooled to provide adequate strength immediately after the formation of the seal, and that enough be allowed to relax by slow cooling to obtain the desired improvement in final strength of the seal.

The method of the invention may be applied to any of the plastics films that may be sealed by the application of heat and pressure. It is particularly useful for sealing polythene films, and especially for sealing the mouths of heavy duty gusseted and non-gusseted polythene sacks, since these are very widely used for the packaging of materials such as fertilizers, chemicals, plastics granules, feeding stuffs and other commodities. The method is also used with particular advantage for sealing together other polyolefine films, for example films of polypropylene or of copolymers of ethylene or propylene with each other or with other polyolefines.

I claim:

1. In a method of forming an elongated heat seal between at least two adjacent layers of plastic film by applying thereto heat sufficient to melt the film layers and then applying forced cooling to the seal so produced while it is held between two surfaces, the improvement consisting in that said forced cooling is applied to only a portion about one half of the width of the seal along the length thereof, and the remaining portion is allowed to cool slowly from the molten state.

2. A method as claimed in claim 1 in which said heat seal is a single elongated weld.

3. A method as claimed in claim 1 in which said heat seal is a composite seal comprising two closely spaced elongated welds, and said forced cooling is applied to only one of the welds.

4. A method as claimed in claim 1 in which the number of layers of film included in the seal varies along the length thereof.

5. A method as claimed in claim 1 in which the elongated heat seal forms an end seal of a gusseted plastic sack.

6. A method as claimed in claim 1 in which the elongated heat seal is formed across the mouth of a filled plastic sack, and said forced cooling is applied to the lower portion of the seal.

7. A method as claimed in claim 1 in which the plastic film is a polyolefine film.

8. A method as claimed in claim 7 in which the plastic film is polythene film.

9. A method as claimed in claim 1 in which the film layers are heated while they are held between two surfaces.

10. A method as claimed in claim 9 in which said two surfaces are the surfaces of a pair of endless bands adapted to be brought progressively into contact with opposite outer surfaces of the assembled film layers, and in which said heating and cooling is applied by heat transfer through the bands.

11. A method as claimed in claim 1 in which the heat is supplied to the layers of plastic film from radiant heaters.

12. A method as claimed in claim 1 in which the layers of plastic film are heated by hot air.

References Cited

UNITED STATES PATENTS

| | | | |
|---|---|---|---|
| 2,469,972 | 5/1949 | Lowry et al. | 656—498 |
| 2,542,901 | 2/1951 | Chaffee | 656—498 |
| 2,698,273 | 12/1954 | Miner et al. | 656—498 X |
| 2,766,809 | 10/1956 | Parham | 656—311 X |
| 2,788,838 | 4/1957 | Crabbe et al. | 656—498 X |
| 2,999,042 | 9/1961 | Meister | 656—290 |

REUBEN EPSTEIN, Primary Examiner